United States Patent [19]

White

[11] 4,027,575

[45] * June 7, 1977

[54] ROUTER FOR TRIMMING LAMINATE PLASTICS

[76] Inventor: Kenneth N. White, 12650 90th Ave., Palos Park, Ill. 60464

[*] Notice: The portion of the term of this patent subsequent to Sept. 21, 1993, has been disclaimed.

[22] Filed: Sept. 27, 1974

[21] Appl. No.: 510,013

[52] U.S. Cl. ................. 90/12 D; 144/134 D; 144/136 C; 144/253 J
[51] Int. Cl.² ............................ B27C 5/10
[58] Field of Search ......... 90/12 D; 144/70, 134 D, 144/136 C, 144 R, 134 A, 253 D, 253 J

[56] References Cited

UNITED STATES PATENTS

| 2,705,032 | 3/1955 | Pearson | 144/134 D |
| 2,717,013 | 9/1955 | Zwalenburg | 144/134 D X |
| 2,756,785 | 7/1956 | Godfrey | 144/134 D |
| 3,207,193 | 9/1965 | Godfrey et al. | 144/134 D X |
| 3,478,788 | 11/1969 | Zelik | 144/134 D X |

*Primary Examiner*—Gary L. Smith
*Attorney, Agent, or Firm*—Alter and Weiss

[57] ABSTRACT

A template unit on a router for trimming laminate plastics comprising a base and template follower. A clearance space exists between the base and template follower for the insertion of material to be flush trimmed. The template follower has a template abutment for the placing of template material adjacent thereto. The base and blade of the router are adjustable for alignment of the blade with respect to the template abutment means.

3 Claims, 3 Drawing Figures

U.S. Patent  June 7, 1977  4,027,575
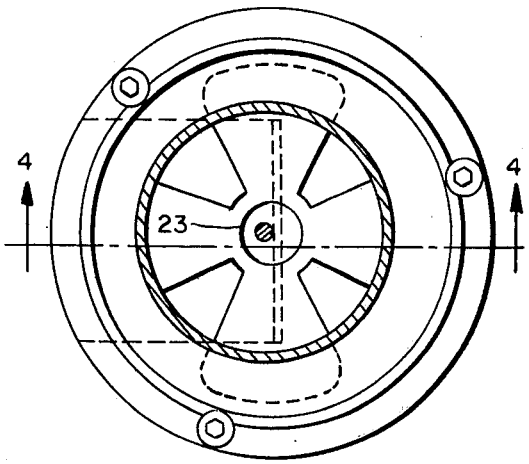
FIG. 3
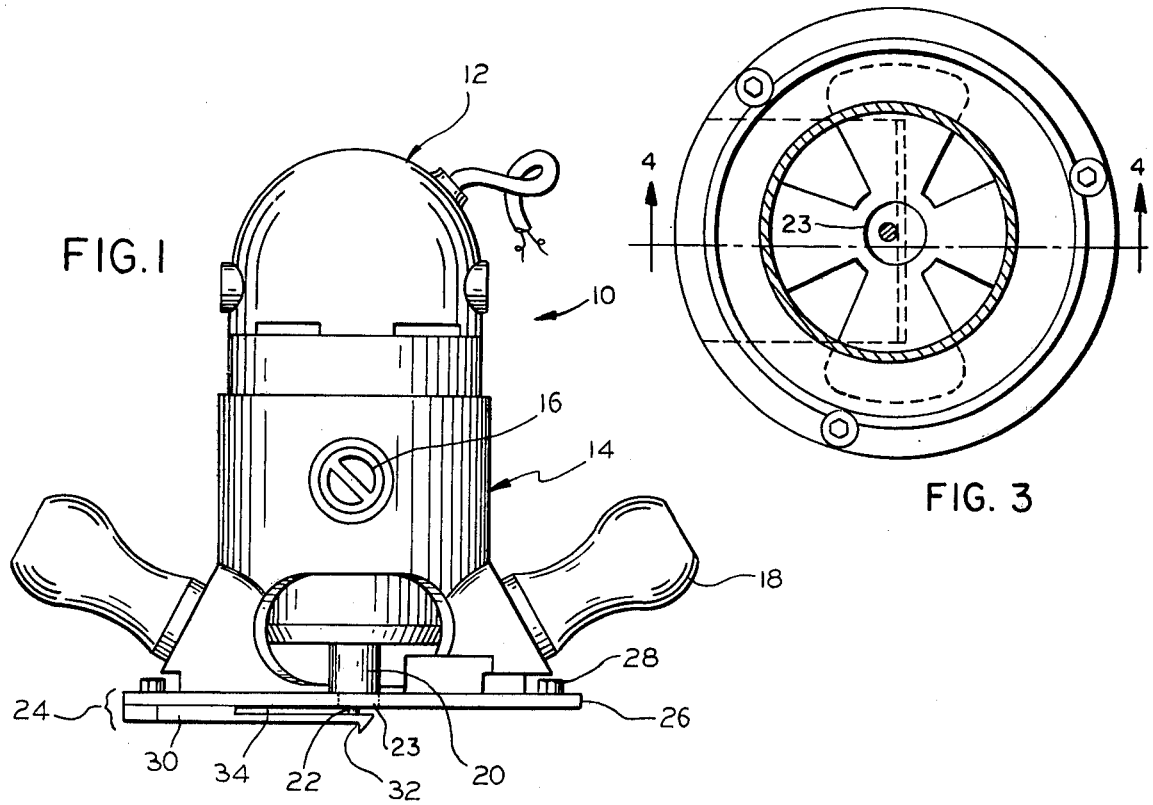
FIG. 1
FIG. 2
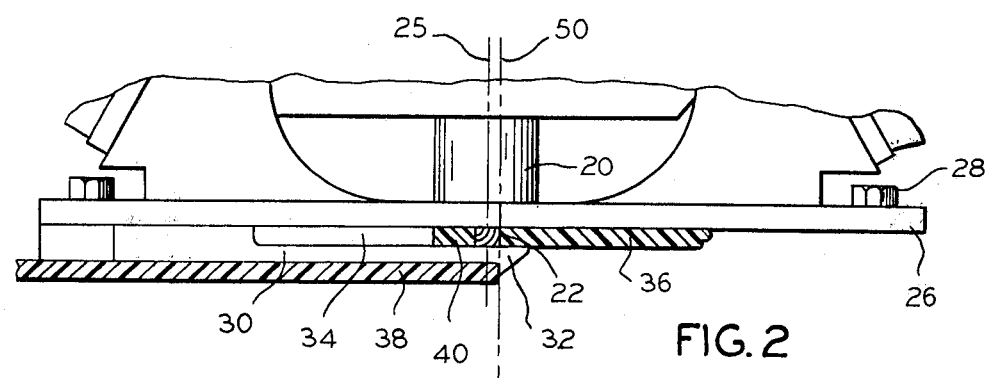
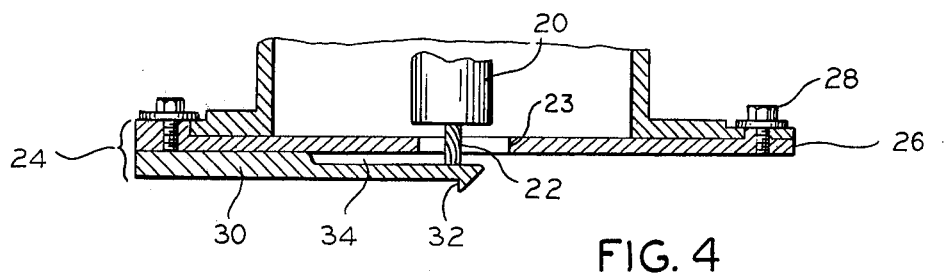
FIG. 4

ROUTER FOR TRIMMING LAMINATE PLASTICS

This application relates to an invention associated with routing tools and is copending with application Ser. No. 510,116 having the same inventor and filing date as this application, and relating to another invention associated with similar routing tools.

This invention relates to a router for trimming laminate plastics and more particularly to the construction of a router with a template unit having a base part and template follower for trimming laminate plastics.

Because of their durability, laminate plastics are widely used as facings on counter tops and edges, surfaces of furniture, and kitchen cabinets. Good laminated plastic fabrication requires precise work. Routers for trimming laminate plastics are widely used in industry today. Such a router is used to trim laminate plastic material to prevent a lip from extending over the edge of counter tops or surfaces of furniture and kitchen cabinets, for example. Through the use of the router, laminate plastic material is trimmed and the edge is made flush.

In the past, several operational steps have been required before the router itself could be used on laminate plastic material. The material to be trimmed had to be measured and a line drawn to indicate where the trimming would occur. Trimming on scrap material would then performed to prevent costly errors in operation.

When a guide mechanism was used, it usually had to be attached to the router, and a separate operation was involved. The attachment was expensive and the operation is lengthy. Several adjustments had to be made for the proper fit of the guide mechanism. If a guide mechanism was not used, a different blade had to be inserted in the router.

Accordingly, an object of this invention is to eliminate the need of premeasuring the cut material prior to trimming and fitting.

A further object is to trim the material so as to not have a lip on the laminate plastic.

Yet another object of this invention is to maintain the facing material as a guide for the material being cut.

A further object is to allow material to be trimmed quickly and inexpensively.

Still another object is to eliminate the necessity of attaching a separate guide means.

In keeping with an aspect of this invention, these and other objects are accomplished by a router for trimming laminate plastics, the router having a unique template unit comprising a base and a template follower attached. The router housing is rotatable relative to the base and thereby the router blade position is adjustable to an exact trimming point. The template follower has a lip which keeps the facing material in place and is a guide for the laminate plastic being trimmed. A clearance space between the base and template follower receives laminate plastic trimmed by the blade which extends down into the clearance space.

The nature of the preferred embodiment of the invention will be understood best from a study of the attached drawings, in which:

FIG. 1 is a side elevational view of the router constructed according to the teachings of this invention;

FIG. 2 is a view of the template unit with facing material inserted into the template follower and another section of laminate plastic inserted into the trimming clearance space for the trimming operation;

FIG. 3 is a cross-sectional view of the template unit without any material inserted.

As shown in FIG. 1, a router 10 has a power unit 12 located in a housing 14. The power unit height within the housing 14 is adjusted by adjustment means 16 located on the external surface of the housing 14. The power unit 14 also rotatably drives the blade 22 about a first axis perpendicular to a base 26.

The housing 14 comprises a circular housing section with two handles 18 and 18', and the base 26 attached at the bottom of the housing. The blade 22 extends from within the housing 14 through a core aperture 23 in the base 26, and projects beyond the bottom of the base 26. The blade 22 is held in place by a collet nut 20. The adjustment means 16 also adjusts the length of the blade 22 extending beyond the base 26.

As shown in FIG. 2, with such a router 10, a template material 38 is used. Such a material is a gauge, pattern or mold, commonly a thin board or plate, used as a guide to the form of the work.

The base 26 with template follower 30 attached thereto, comprise the template unit 24. Between the base 26 and template follower 30 is a clearance trimming space 34 for receiving the insertion of laminate material to be trimmed. The router blade tip extends down to a point in the clearance space 34 and makes contact with the laminate material to be trimmed. The template follower 30 has at its inner periphery guide means, herein referred to as a template abutment 32, for placing adjacent to a template material 38. The template abutment 30 is adapted to follow a surface of a template material 38 placed as a guide under the follower 30. The template abutment 30 extends in axial alignment with the tip of the blade 22 downward below the tip of blade 22, and is particularly adapted to engage a perpendicular surface or edge on the template material 38.

In operation as seen in FIG. 2, blade 22 is first rotatably adjusted to be in the same vertical plane 50 as the template abutment 32. This is done by rotating the housing 14 relative to the base 26 thereby changing the horizontal position of the template abutment 32 relative to the blade 22 protruding through core aperture 23. The rotation aligns the blade 22 for trimming the material. A template material 38 is placed adjacent to the template abutment 32. The template abutment 32 is disposed in a vertical plane with the circumference of the blade 22.

The router is moved adjacent to and follows the contour of the template material 38, which is held adjacent to the template abutment 32. Operationally, the template abutment serves two major purposes: (1) to guide a router on the outer edge of the guide material, and (2) to prevent slippage of the router and thereby prevent errors in operation, all of which enables a perfectly matching fit between the guide material and trimmed material. A laminate plastic material 36 is inserted in the clearance space 34 between the base 26 and the template follower 30. The inserted material 36 edge is then trimmed flush.

On completion of the routing operation, the facing material 38 and the routed material 36 are in an exact face to face fit, and there is no lip.

The clearance space 34 is longer and thicker than the laminate plastic material having an edge trimmed. This router is used for trimming thin surfaces only. If a thick surface is to be cut, power saws or other tools are required.

In addition to the forementioned specifications, once a template material 38 is placed adjacent to the template abutment 32, it remains stationary through the complete operation. Also, the router blade 22 once adjusted for an operational process remains stationary and no further adjustment or attachment is necessary.

While the foregoing specification describes, and the drawings show a preferred embodiment of the invention, it should be apparent that various modifications may be made without departing from the spirit or scope of the invention. Therefore, the amended claims are to be construed to cover all equivalent structures.

I claim:

1. A router for trimming adjacent coplanar laminate materials comprising:
   a housing having a base;
   a power unit within said housing for rotatably driving a cutting blade about a first axis perpendicular to said base;
   said cutting blade extending beyond said base;
   means for adjusting the amount of said cutting blade extending beyond said base;
   a template follower having guide means substantially disposed about a first side of said cutting blade for following the contour of the surface of a template material positioned along said first side; and
   a clearance space between said base and said template follower which exposes said cutting blade to a second side substantially opposite said first side for insertion of a second laminate material adjacent said second side for trimming thereupon by said router;
   said guide means including a template abutment extending in a plane substantially tangent to the circumference of said blade.

2. The router of claim 1 wherein said cutting blade extends through an aperture in said base;
   the tip of said cutting blade extending into said clearance space, whereby said material to be trimmed is disposed in said clearance space between said base and said template follower and in contact with said blade tip.

3. The router of claim 1 wherein said template follower is disposed adjacent said template material, and said guide means contacts and follows a surface of said template.

* * * * *